(12) United States Patent
Eichenberger et al.

(10) Patent No.: US 8,370,575 B2
(45) Date of Patent: Feb. 5, 2013

(54) OPTIMIZED SOFTWARE CACHE LOOKUP FOR SIMD ARCHITECTURES

(75) Inventors: Alexandre E. Eichenberger, Chappaqua, NY (US); John Kevin Patrick O'Brien, South Salem, NY (US); Tao Zhang, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 11/470,638

(22) Filed: Sep. 7, 2006

(65) Prior Publication Data

US 2008/0065809 A1   Mar. 13, 2008

(51) Int. Cl.
*G06F 12/00*   (2006.01)
*G06F 13/00*   (2006.01)
*G06F 13/28*   (2006.01)

(52) U.S. Cl. .................. 711/118; 711/207; 711/221
(58) Field of Classification Search .................. 711/118
See application file for complete search history.

(56) References Cited

U.S. PATENT DOCUMENTS

| | | | |
|---|---|---|---|
| 6,591,343 B1 * | 7/2003 | Col et al. | 711/125 |
| 6,622,208 B2 * | 9/2003 | North | 711/118 |
| 2005/0268038 A1 * | 12/2005 | Yasue | 711/118 |
| 2005/0273769 A1 | 12/2005 | Eichenberger et al. | |
| 2005/0273770 A1 | 12/2005 | Eichenberger et al. | |
| 2005/0283769 A1 | 12/2005 | Eichenberger et al. | |
| 2005/0283773 A1 | 12/2005 | Eichenberger et al. | |
| 2005/0283774 A1 | 12/2005 | Eichenberger et al. | |
| 2005/0283775 A1 | 12/2005 | Eichenberger et al. | |
| 2006/0190700 A1 * | 8/2006 | Altman et al. | 712/7 |
| 2007/0028047 A1 * | 2/2007 | Williamson et al. | 711/118 |

OTHER PUBLICATIONS

U.S. Appl. No. 11/535,172 (Eichenberger et al.), filed Sep. 26, 2006 and entitled, "Workload Partitioning in Heterogeneous System with Heterogeneous Alignment Constraints".
U.S. Appl. No. 11/535,181 (Eichenberger et al.), filed Sep. 26, 2006 and entitled, "Generating Optimized SIMD Code in the Presence of Data Dependencies".

* cited by examiner

*Primary Examiner* — Brian Peugh
*Assistant Examiner* — Prasith Thammavong
(74) *Attorney, Agent, or Firm* — Michael J. Le Strange; Roberts Mlotkowski Safran & Cole, P.C.

(57) ABSTRACT

Process, cache memory, computer product and system for loading data associated with a requested address in a software cache. The process includes loading address tags associated with a set in a cache directory using a Single Instruction Multiple Data (SIMD) operation, determining a position of the requested address in the set using a SIMD comparison, and determining an actual data value associated with the position of the requested address in the set.

38 Claims, 11 Drawing Sheets

OPTIMIZED SOFTWARE CACHE LOOKUP FOR SIMD ARCHITECTURES

FIELD OF THE INVENTION

The invention generally relates to a method, product and system for a software cache for caching objects that are repetitively used locally.

BACKGROUND OF INVENTION

Computer processors function by processing data elements through various registers in accordance with instructions provided by a computer program. The processor executes instructions in the form of machine language, which are the low-level instructions relating to what data elements are processed through which registers. Most software, however, is written in higher-level programming code, such as C++, which has the advantages of being human readable and of embodying relatively complex processing operations using comparatively short, quickly-written commands. A compiler receives the high-level programming code, and based upon the programming of the compiler itself, generates the machine language that is readable by a processor.

Software cache is a robust solution to locally cache remote data in systems that do not have a hardware cache, such as synergistic processing elements (SPEs) in a cell broadband engine. Using such software caches, a program can load from global address space data it requires on a need basis, which is extremely convenient when either the data access pattern is irregular, the data footprint is larger than the local memories, or a combination of both.

Due to high memory latencies of direct memory access (DMA) requests to get data in and out, performance software caches are significantly increased by increasing the set associativity of software caches. By increasing the associativity of the cache, the software cache subsystem is more resilient to multiple frequently accessed data that hash to the same cache set.

The problem with larger set associativity of software cache is mainly that it increases the amount of work required to be performed by the processor to detect whether an access is a hit or a miss, a task referred to as "cache lookup." This cost also exists in hardware caches, but the latency of the cache lookup is hidden by using content addressable memory (CAM). When implementing cache in software, typical processors such as the SPE do not have access to the programmable CAM. As a result, testing for a match must be performed explicitly for each of the tags in a cache set.

SUMMARY OF THE INVENTION

It is known to use Single Instruction Multiple Data (SIMD) operations to enhance the performance (i.e., speed) of processors. Generally speaking, SIMD operations enhance performance by efficiently handling large quantities of data in parallel. Processors with SIMD capability are currently used in a wide range of machines, e.g., supercomputers, personal computers, game machines, etc.

In embodiments, the invention is directed to a process of loading data associated with a requested address in a software cache. The process includes loading address tags associated with a set in a cache directory using a SIMD operation, determining a position of the requested address in the set using a SIMD comparison, and determining an actual data value associated with the position of the requested address in the set.

According to feature of the invention, the process can further include finding the set containing an address tag of the requested address through a predefined mapping of addresses, and splatting the requested address into a SIMD register.

In accordance with another feature of the invention, the requested address can include an upper part corresponding to an address tag and a lower part to determine an address offset to identify the actual data value associated with the position of the requested address.

Further, after the SIMD comparison, the process may further include locating a data pointer corresponding to the position of the requested address in the set, and loading the data associated with the data pointer.

According to a further feature, each set can be composed of tag data banks, and each tag data bank may include a plurality of entries filled with a respective address tag replicated in each entry. A data structure can include data banks, in which each data bank is associated with a respective tag data bank, and the data associated with each set and data bank can be aligned in memory so as to be efficiently accessed by SIMD memory operations. After the SIMD comparison, the process may further include identifying a data bank containing the actual data value corresponding to the tag data bank for the requested address. The requested address can include a lower part to determine an address offset to identify the actual data value in the data bank. The address offset may be determined for each data bank before the SIMD compare is completed.

DETAILED DESCRIPTION OF EMBODIMENTS OF THE INVENTION

Software cache is a well known approach to caching objects that are repetitively used locally. The invention is directed to an optimized software cache handler taking advantage of SIMD execution pipes and speculative executions to reduce the hit latency of such software cache. In one embodiment, SIMD code is used to rapidly detect hit in the cache while preserving maximum data layout of the data currently in the cache. In another embodiment, a fix layout of the data in the cache is used to concurrently detect hit situations in a simdized fashion and speculatively loading the data from the cache.

Figure 1:
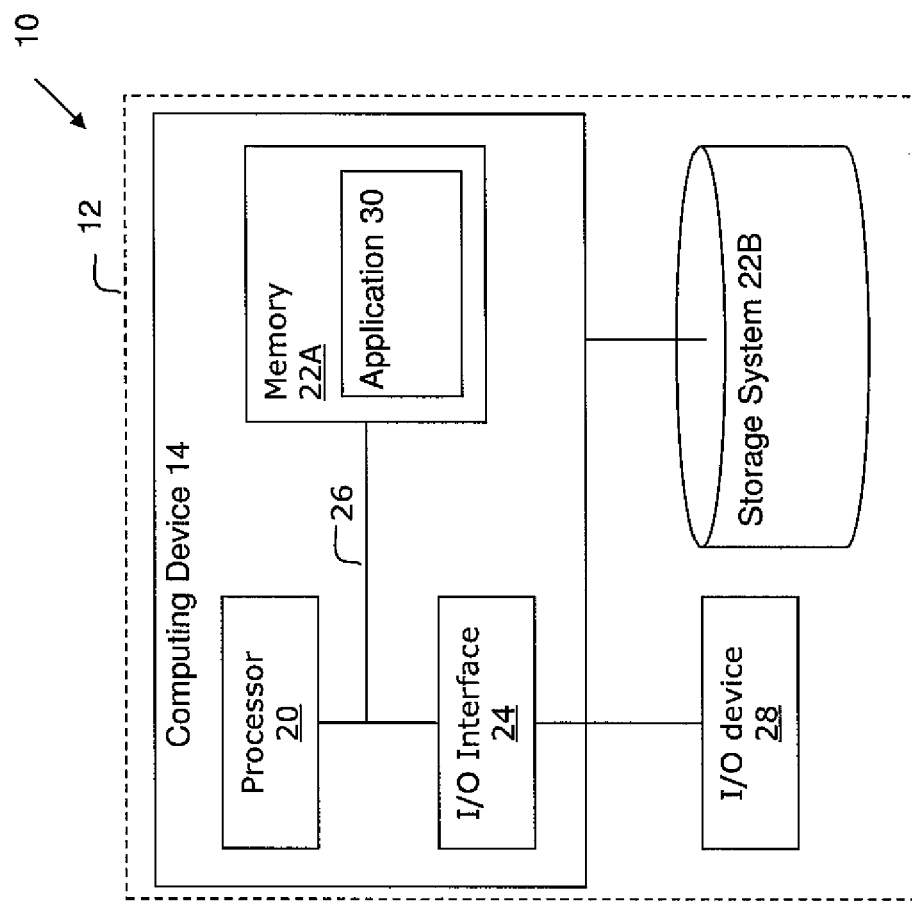
FIG. 1 shows an illustrative environment according to aspects of the invention.

FIG. 1 shows an illustrative environment 10 for managing the processes in accordance with embodiments of the invention. To this extent, the environment 10 includes a computer infrastructure 12 that can perform the processes described herein, such as, for example, generating optimized SIMD code. In particular, the computer infrastructure 12 is shown including a computing device 14 that comprises an application 30, which makes computing device 14 operable to perform at least some of the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the application 30 enables computer infrastructure 12 to perform the processes described herein, such as, for example, generating optimized SIMD code. In embodiments, the application 30 comprises compiler software that is capable of performing the processes described herein.

Figure 2:
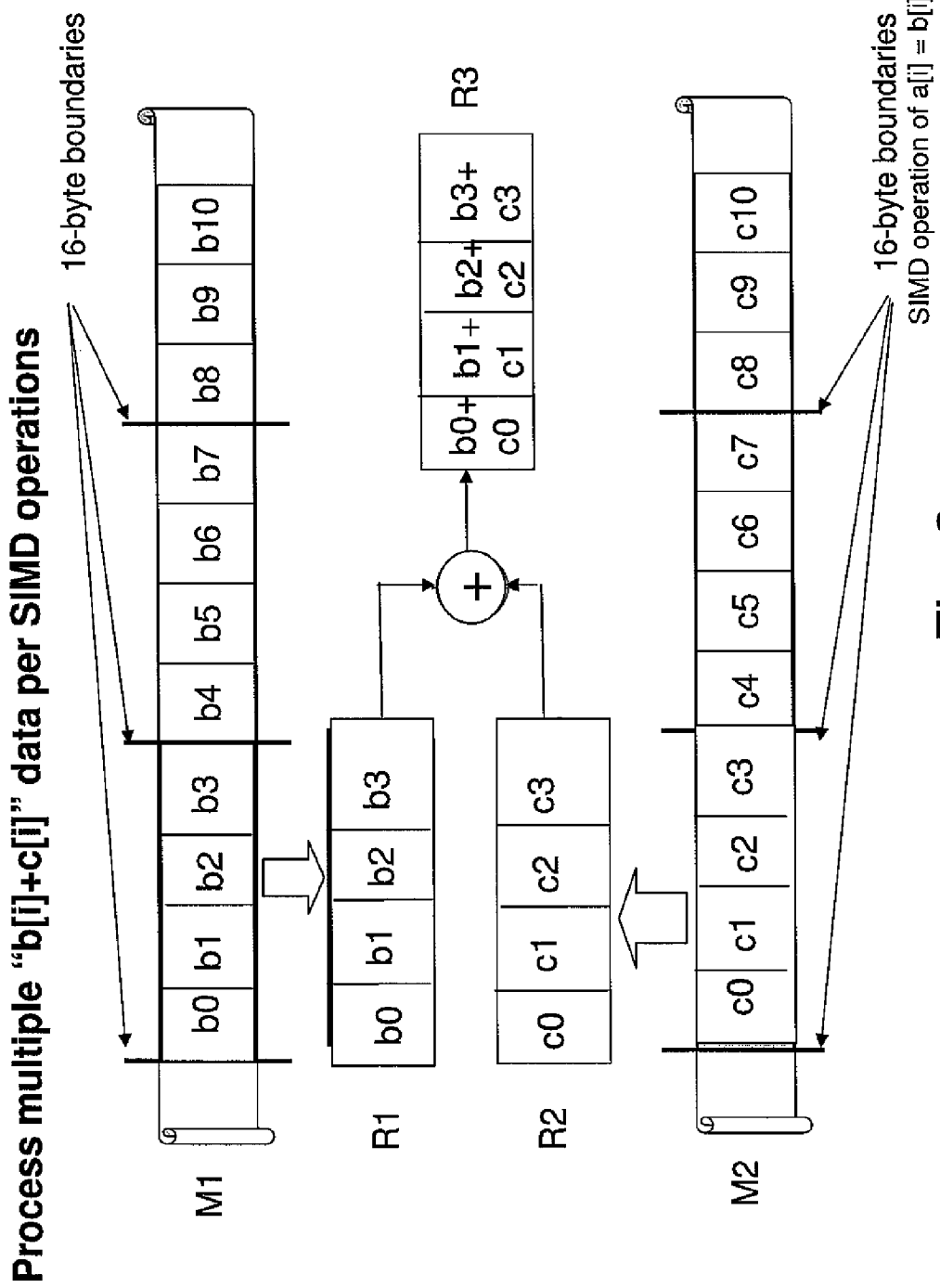
FIG. 2 depicts the processing of multiple data via SIMD operations.

FIG. 2 depicts the processing of multiple data via SIMD operations, as will be understood by one of ordinary skill in the art. Data elements are loaded in sixteen byte "chunks" from memory M1, M2 to registers R1, R2, and subsequently processed (in this example, they are added according to the statement a[i]=b[i]+c[i]). Although the invention is described in terms of using sixteen byte chunks, sizes other than sixteen bytes may also be used in accordance with implementations of the invention. The result in register R3 is stored back into memory. SIMD operations, such as that depicted in FIG. 2, are capable of providing enhanced computing performance because performing operations simultaneously on chunks of data is generally faster than performing the same operation on each data element individually.

Figure 3:
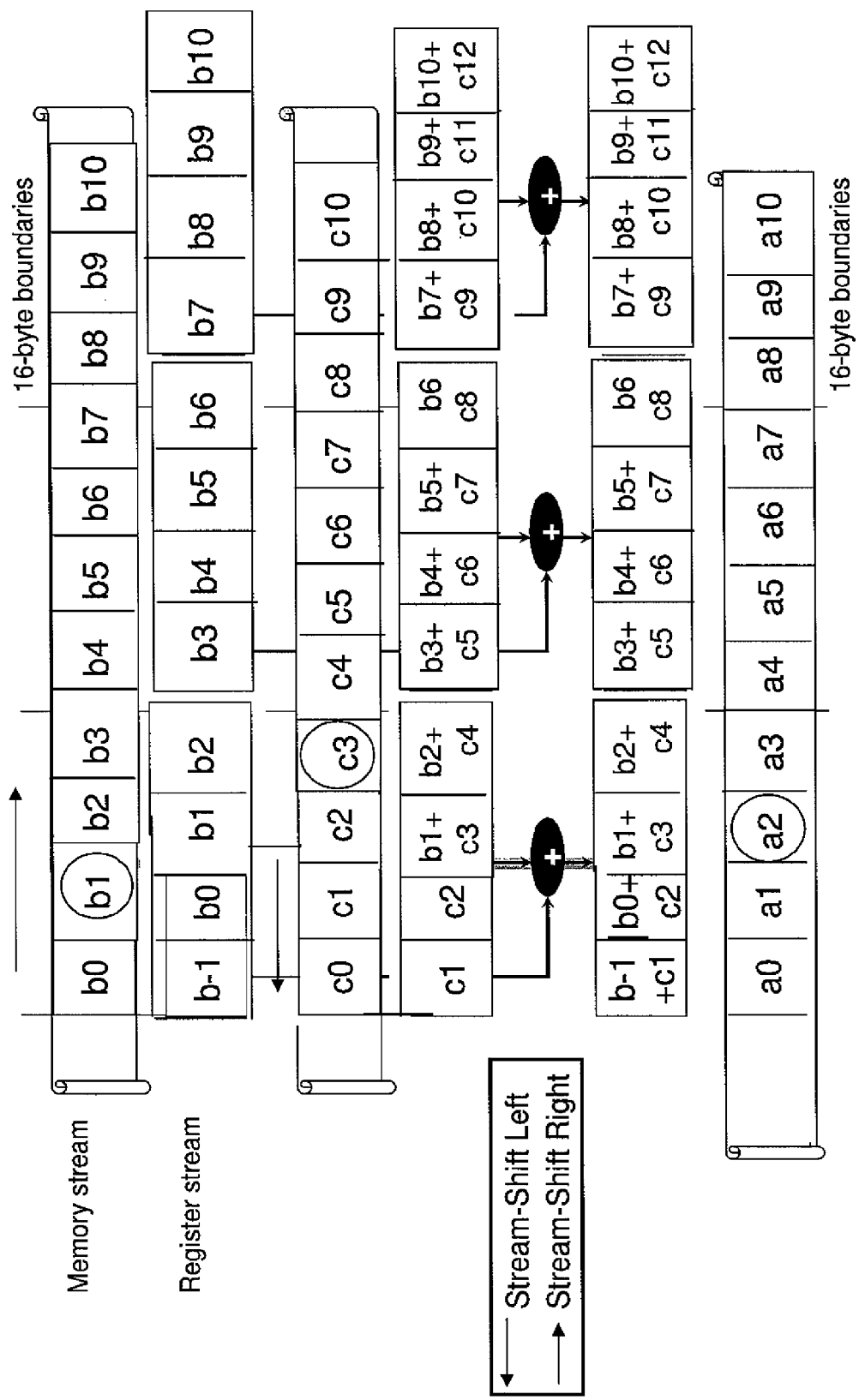
FIG. 3 depicts an aspect of simdizing in the presence of non-aligned data.

FIG. 3 also depicts the processing of multiple data via SIMD operations. However, due to the statement a[i+2]=b[i+1]+c[i+3], the data chunks to be processed are not aligned (e.g., not parallel) as they were in FIG. 2. Because the data chunks of "b" and "c" are not respectively aligned, and in addition because neither of the data chunks of "b" and "c" are aligned with the target storage location of "a", the chunks must be shifted in order to produce the proper (e.g., desired) result. Accordingly, the chunks of "b" are loaded from their memory stream to a register stream, and then shifted in the register stream so that they align properly with the specified storage location. In this example, this is accomplished by shifting the chunks of "b" one location to the right. Software and hardware implementations of shifting data in this manner are well known in the art. Similarly, the chunks of "c" are loaded from their memory stream to a register stream, and then shifted in the register stream so that they align properly with the specified storage location. In this example, this is accomplished by shifting the chunks of "c" one location to the left. The data chunks are processed (e.g., added) and stored in the correct location of "a". This methodology is known as Shift-To-Store (STS) because the data are shifted to the storage location.

Figure 4:
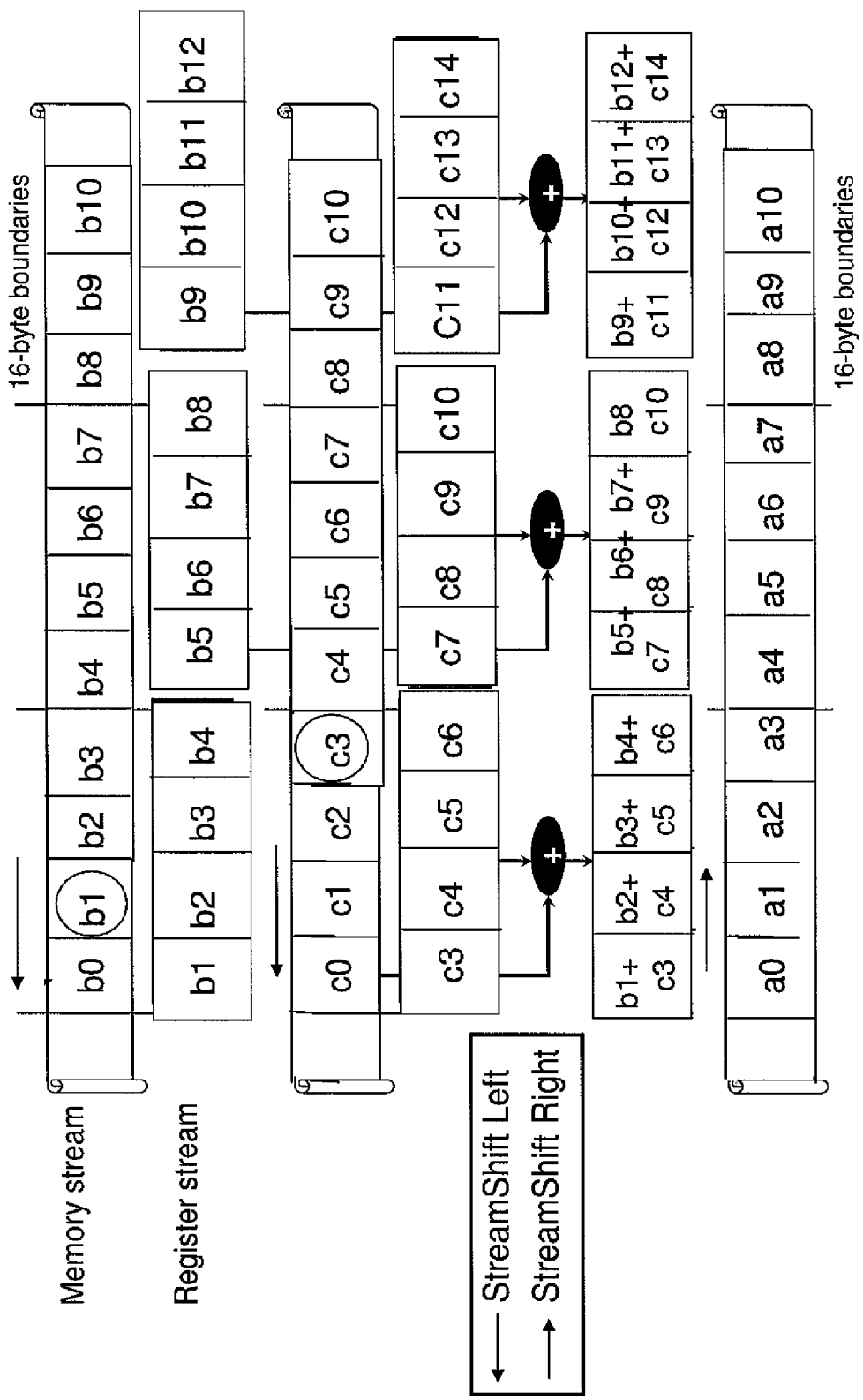
FIG. 4 depicts another aspect of simdizing in the presence of non-aligned data.

FIG. 4 depicts an alternative method of processing, via SIMD operations, the same data as that of FIG. 3. However, instead of shifting the data chunks to the storage location and then processing and storing, here the data chunks are shifted to a zero location and processed. The results are then shifted to the storage location and stored. This methodology is known as Shift-To-Zero (STZ).

Figure 5:
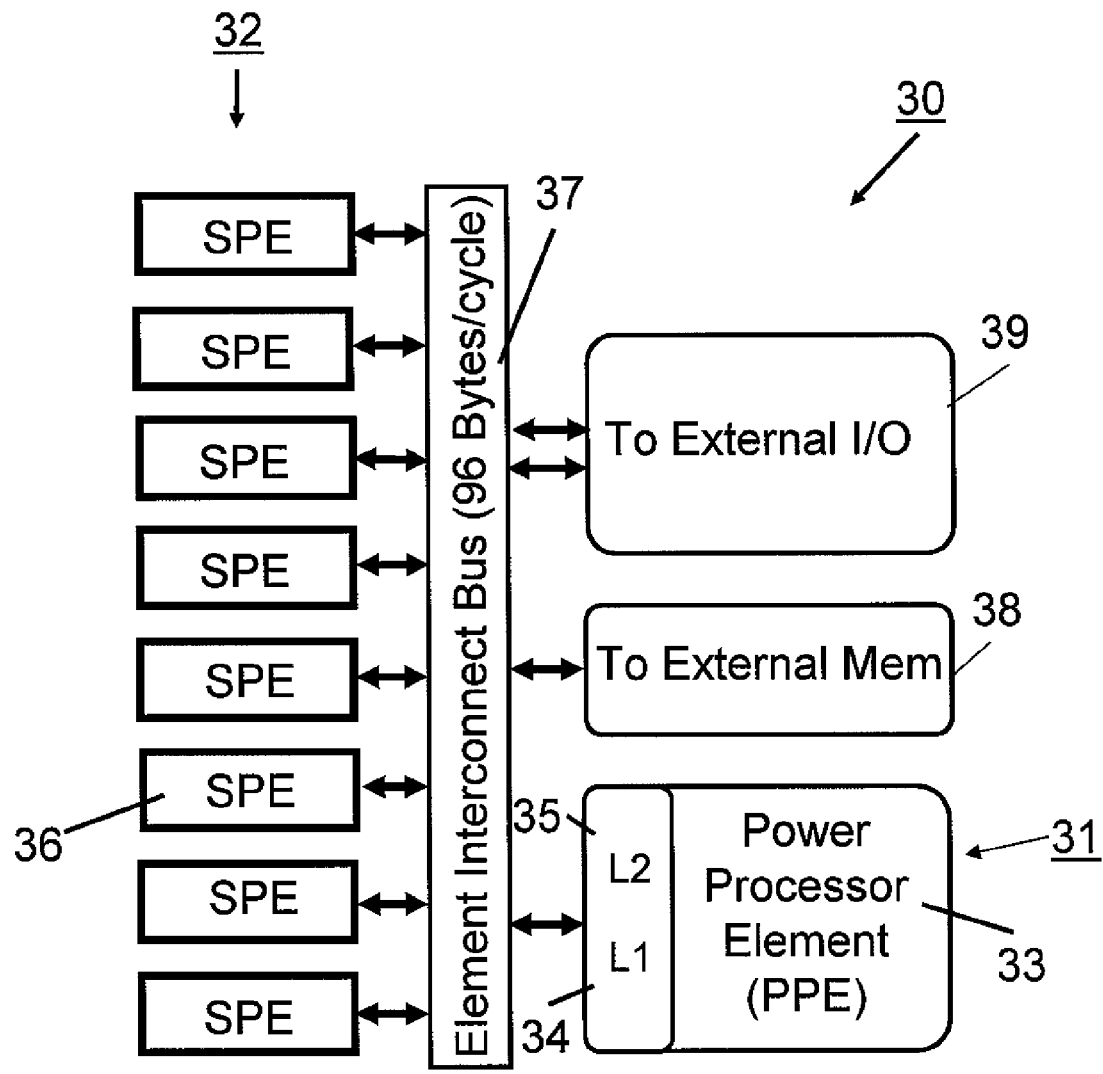
FIG. 5 illustrates a cell broadband engine for the invention.

According to an embodiment of the invention illustrated in FIG. 5, a cell broadband engine 30 is utilized, which is composed of a multi-threaded power processor 31 and at least one, e.g., eight, compute-intensive ISA engines 32. Power processor 31 can include a power processor element (PPE) 33 having a level 1 cache 34 and a level 2 cache 35. The compute-intensive ISA engines can be synergistic processing elements (SPE) 36, which are single input multiple data (SIMD) only engines. SPE 36 is a fast processor with local memory that provides fast access to, e.g., 256 kB local memories. However, nothing is stored in these local memories without explicit instructions to do so through a direct memory access (DMA) request to transfer data. An element interconnect bus 37 is provided to interconnect multi-threaded power processor 31, ISA engines 32, and at least two configurable interfaces, e.g., to provide access to external memory 18 and to external input/output devices 39. The level 1 and level 2 caches 34 and 35 of PPE 33, SPEs 36, and the external memory 38 and devices 39 are coupled to element interconnect bus 37 to transfer 8 bytes per direction, whereas element interconnect bus can transfer, e.g., 96 bytes/cycle.

Moreover, cell broadband engine 30 is advantageous in that it has a high bandwidth. For example, with a clock rate of 3.2 GHz, element interconnect bus operates at 200 GB/s and the data transfer from bus to element is 76.8 GB/s.

Figure 6:
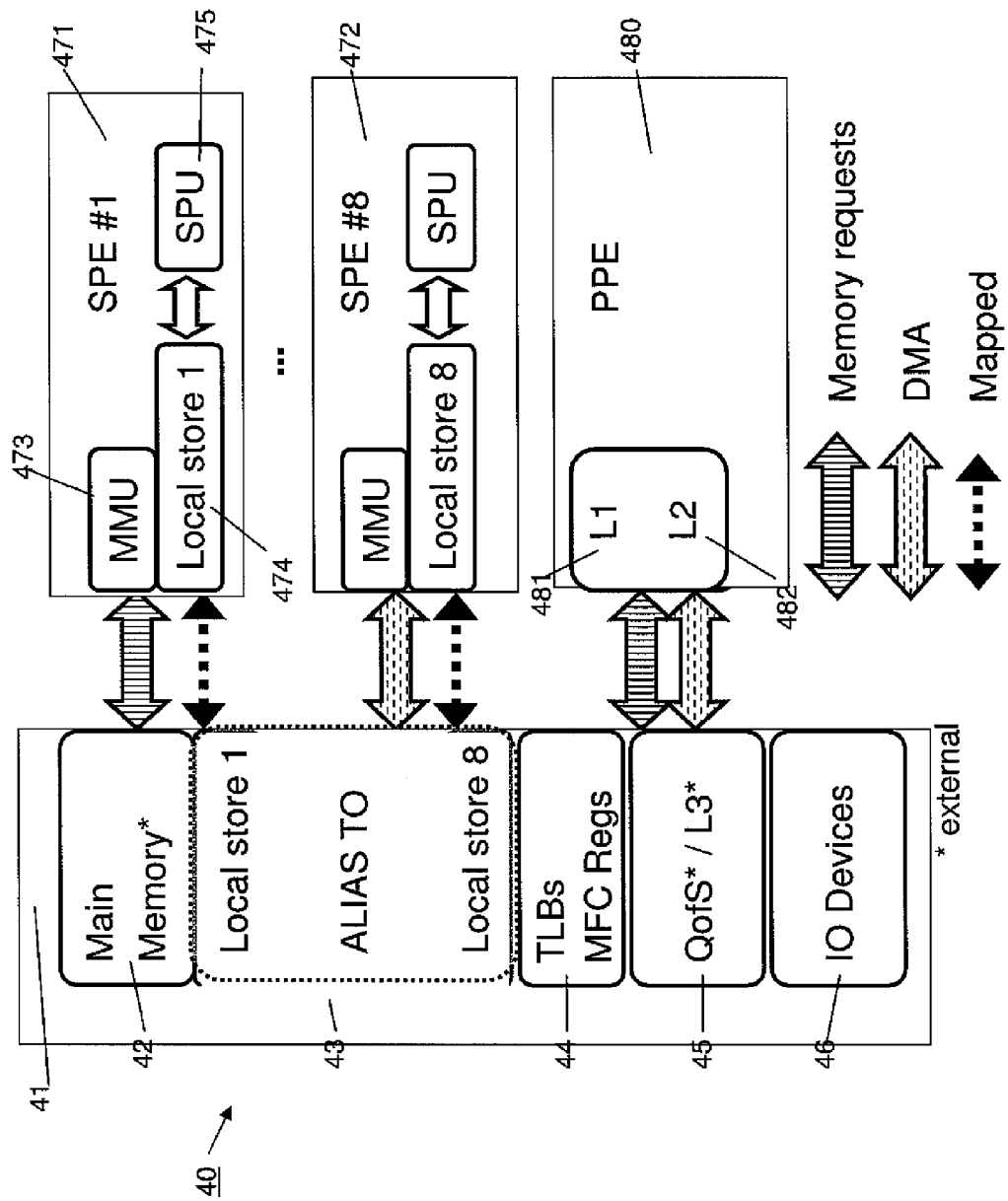
FIG. 6 illustrates cell memory and DMA architecture.

FIG. 6 shows a more detailed view of an embodiment of the cell memory and architecture 40. According to this embodiment, scroll 41 represents memory and for clarity and ease of explanation includes a listing of what is contained in memory, such as main memory 42, alias to local stores 43, e.g., 1-8, TLBs MFC registers 44, QofS/L3 45, and input/output devices 46. Main memory 42 and QofS/L3 can be external to the Cell Broadband Engine chip, and alias to local stores 43 allows access to local stores of other SPE. SPEs 471 and 472 have a similar architecture and include a memory management unit (MMU) 473, a local store 474, which can be a 256 k memory device, and an SPU 475, which is a SIMD processor. SPU 475 is a small dedicated processor having no direct access to external memory, such that SPE 471 initiates direct memory access (DMA) requests to any global addresses as well as to local stores of other SPEs, since local stores are mapped in global address space. Translation is done by MMU 473. Further, PPE 480, which includes level 1 and level 2 caches 481 and 482, can access memory either directly or through a DMA request.

In contrast to the PPE, the SPEs form a software cache that is advantageous. While SPEs provide fast processing, support is needed when the local stores are full. The compiler, which is software designed to convert written code into a computer readable form, provides such support for the SPEs. For example, the compiler partitions SPE code that is too large, and a partition manager pulls code into the SPE as needed. Further, when data with regular accesses, e.g., MPEG streams or other data having a well known pattern that is easy to process, is too large, the compiler can stage data in and data out operations with the SPE, using static buffering. Moreover, with regular access, the compiler can hide latencies by using double buffering. The software cache is particularly advantageous when data with irregular accesses, i.e., complex searches, is present. In this regard, the SPEs utilize indirection and runtime pointers. Further, a software cache approach to pull data in and out can be employed.

Data with irregular accesses cannot typically reside permanently in the SPEs local memory, and, therefore, reside in global memory. When accessed, the global address of the irregular accesses must be translated into a local store address, and must pull data in and out when not already present. Further, a software cache is used to manage the SPEs in the local store, to generate DMA requests to transfer data to and from global memory, and to use 4-way set associative cache to naturally use the SIMD units of the SPE.

Figure 7:
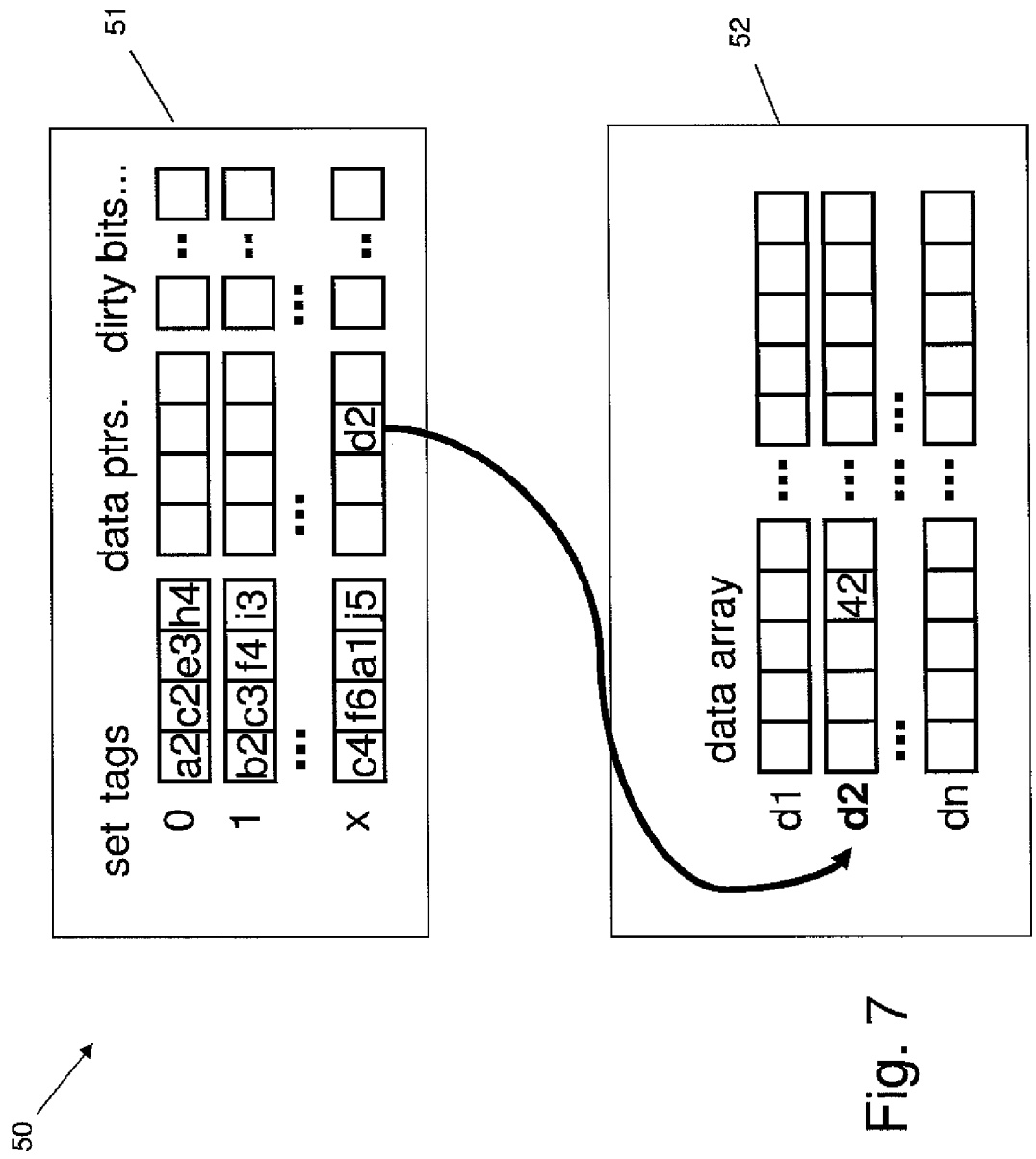
FIG. 7 illustrates a software cache utilizing SIMD architecture to process fast SIMD instruction sequences in accordance with the invention.

In an exemplary embodiment of the invention illustrated in FIG. 7, a software cache utilizes SIMD architecture to process fast SIMD instruction sequences. By utilizing the SIMD nature, the process speed of the software cache can be increased. By way of example, if data is contained within the local cache, the data is returned in about 6 cycles, whereas if the data must be fetched through a DMA request to memory, data is not returned for 200-300 cycles. A software cache architecture 50 according to the invention is composed of a cache directory 51, using, e.g., 16 kB of data, and a separate data structure 52, using, e.g., 64 kB of data. As is known, the cache directory contains information about data you have, while the separate data structure includes the actual data. Cache directory 51 includes x number of sets, e.g., 128, in which each set contains a set associative cache or tags of addresses of data contained in the set. While the exemplary embodiment depicts a 4-way set associative cache, it is noted that any number of sets or tag addresses can be utilized without departing from the spirit and scope of the present invention. Moreover, each set includes data pointers, which is a temporary data store, for each of the tags on the set. The data pointers identify a data line in a data array of data structure 52 storing the data associated with the tags. In this manner, cache directory 51 utilizes predefined mapping of addresses to sets. Moreover, each set also includes dirty bits to keep track of recent usage of data associated with the tags. Data structure 52 contains the actual data identified in cache directory 51, and is composed of, e.g., 512×128B lines.

Each address can be formed, e.g., by a 25 bit upper part (most significant bits) and a 7 bit lower part (least significant bits). In this manner, the upper part is utilized to determine the data pointer in the cache directory, and the lower part is used to identify which data in the relevant data line is to be selected. By way of example, assuming the data in address a1 is sought, because the addresses in the local store are mapped, the predefined mapping of addresses reveals the address is in set x of cache directory 51. As a1 is the third tag in set x, the third data pointer d2 identifies where the data for address a1 is stored in data structure 52. The lower part of address a1 identifies which value to return from the data in data line d2, e.g., the fourth element in this example.

If address a1 is not found in the predefined mapping, a miss request is generated, whereby a DMA request is made to find the information in external memory. Further, when address a1 is not found one of the tag in the set must be evicted. There is a multitude of policies to determine which set to evict, such as Least Recently Used (LRU), First In First Out (FIFO), random, and others. In LRU, for example, the oldest tag, in terms of longest time since last access, will be replaced with address a1. Assuming the oldest tag is c3, the dirty bits are checked to determine whether c3 has been changed. If changed, the data associated with tag c3 is saved, and at the same time the new data from address a1 is retrieved and stored in an data line in data structure 52. Then the tags are updated to replace c3 with a1 so the pointer points to the data line in which a1 is stored.

Figure 8:
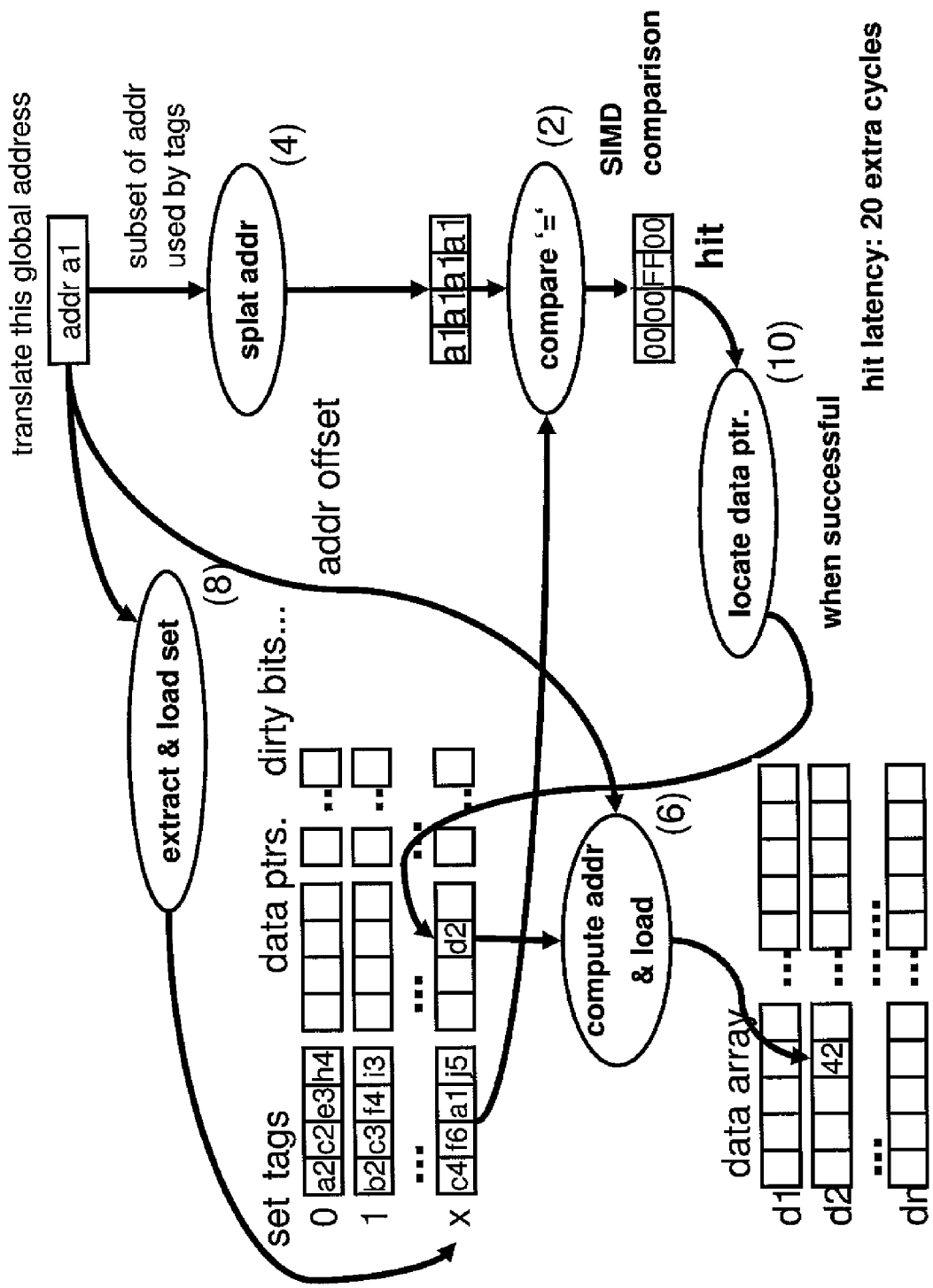
FIG. 8 shows a process for utilizing the architecture of the exemplary embodiment of FIG. 7.

The process for utilizing software architecture 50 can operate in accordance with the FIG. 8. Initially, the compiler determines the next address by translating the global address, e.g., address a1. Using the predefined mapping to determine which set address a1 is located, a SIMD operation extracts and loads set x, e.g., addresses c4, f6, a1, j5, in a SIMD register. However, as noted above, when loading SIMD, alignment issues can arise, e.g., because in some instances, SIMD loads by truncating the least significant bits of the addresses, which result in loading a wrong data. Thus, in accordance with the present invention, when extracting and loading data in a SIMD operation, alignment issues must be addressed to ensure that the data structure from which the data loads was carefully laid to prevent the loading of wrong data. These alignment issues can be addressed in any number of conventional SIMD alignment procedures, e.g., as set forth in the above-described FIGS. 2-5.

At the same time as the SIMD loading of set x, a splat of address a1 is performed which replicates the requested address in another SIMD register. The data in the SIMD registers are compared in a SIMD comparison to find the third entry is a "hit." Thus, this is an example where the power of SIMD instructions are harnessed to speedup the determination of a hit or a miss in the cache directory structure. Next, the third data pointer d2 associated with set x is located. The address is computed and loaded into a register along with the address offset, i.e., the 7 bit lower part (least significant bits) of the address, to determine the data 42 in data line d2.

According to this embodiment, the extracting and loading of the tags of the identified set is completed in 8 cycles, while the address splat is completed in 4 cycles. The SIMD compare is completed in 2 cycles, while the data pointer is located in 10 cycles, and the computing of the address offset and loading of the data is completed in 6 cycles. Thus, when there is a hit, the data is acquired in 26 cycles.

Figure 9:
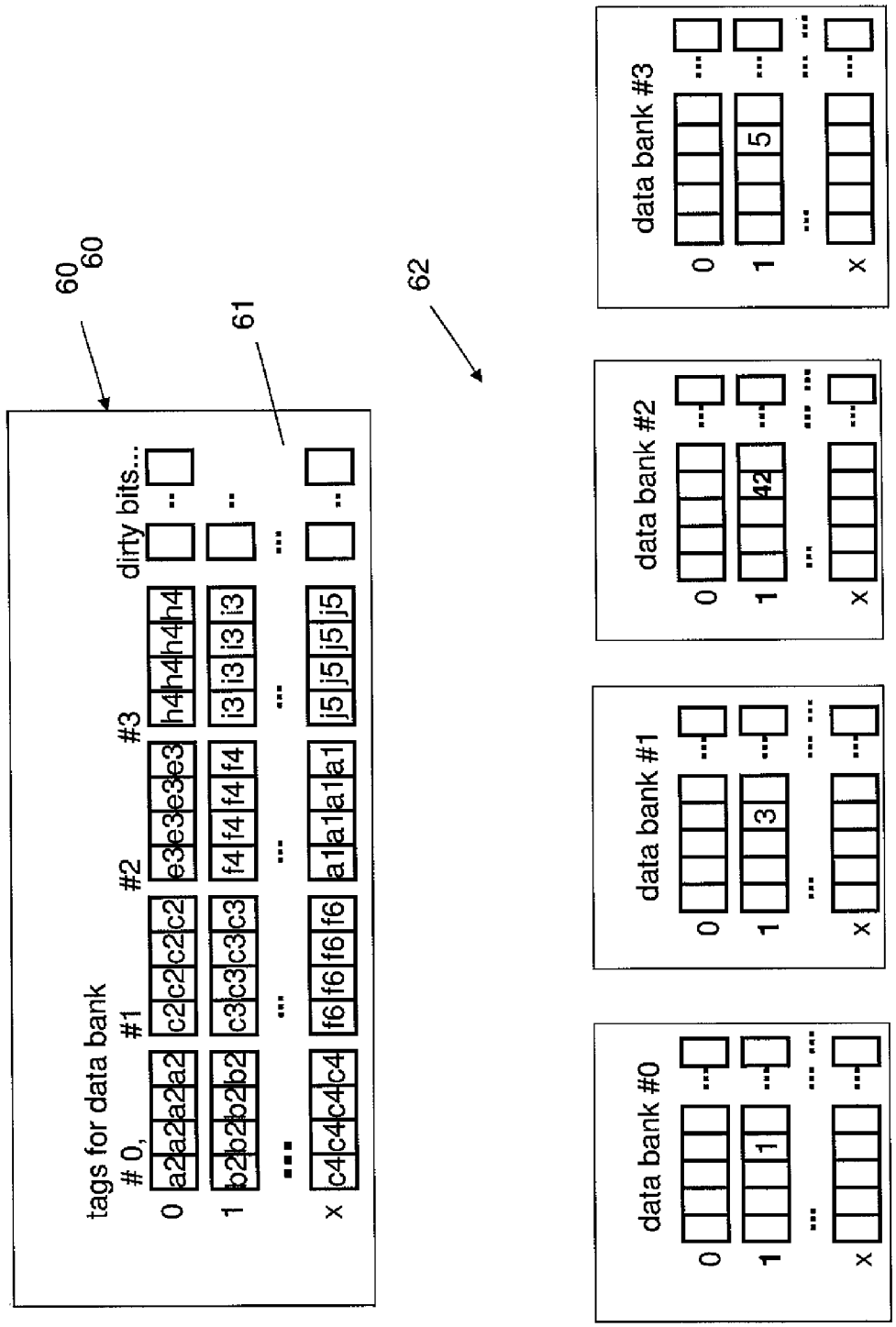
FIG. 9 illustrates an alternative embodiment of the software cache architecture depicted in FIG. 7.

According to the invention, an alternative embodiment of the software cache architecture depicted in FIG. 7 is illustrated in FIG. 9. A software cache architecture 60 according to this alternative embodiment is composed of a cache directory 61, using, e.g., 16 kB of data, and a separate data structure 62, using, e.g., 64 kB of data, is composed of a number of data banks. While this alternative embodiment utilizes four data banks, i.e., #0-#3, the number of data banks is not limited to the depicted example, and any number of data banks can be utilized without departing from the spirit and scope of the present invention. Cache directory 61 includes x number of sets, e.g., 128, in which each set contains a set associative cache or tags of addresses of data contained in the set. As discussed above, while this exemplary embodiment depicts a 4-way set associative cache, it is noted that any number of sets or entries can be utilized without departing from the spirit and scope of the present invention. In contrast to the exemplary embodiment of FIG. 7, each tag in this alternative embodiment is composed of replicated data, i.e., tag 2 of set x is composed of data a1,a1,a1,a1. Note that, in this alternative embodiment, the tag is replicated a number of times such that the replicated tag uses all the bits in the SIMD width of the target machine. Assuming in our example 32 bit addresses and a SIMD width of 128 bits, this tag is thus replicated 4 times. Further, the data tags identify which data bank the data is stored. Therefore, no data pointers are necessary in this embodiment. However, each set still includes dirty bits to keep track of recent usage of data associated with the tags. As discussed above, data structure 62 is composed of, e.g., four (4) data banks, and each data bank is associated with a respective tag.

Again, each address can be formed, e.g., by a 25 bit upper part (most significant bits) and a 7 bit lower part (least significant bits). However, in this embodiment, the upper part is utilized to determine which tag of the set the address is located, and the lower part is used to identify which data in the data bank is wanted. By way of example, assuming the data in address a1 is sought, because the addresses in the local store are mapped, the predefined mapping of addresses reveals the address is in set x of cache directory 61. The upper part of the address is used to identify a1 as the third tag, i.e., in bank #2, of set x, and the lower part of the address is used to identify the data in data bank associated with bank #2.

If address a1 is not found in the predefined mapping, a miss request is generated, whereby a DMA request is made to find the information in external memory. Further, when address a1 is not found, one of the tag in the set must be evicted. There is a multitude of policies to determine which set to evict, such as Least Recently Used (LRU), First In First Out (FIFO), random, and others. In LRU, for example, the oldest tag, in terms of longest time since last access, will be replaced with address a1. Assuming the oldest tag is c3, the dirty bits are checked to determine whether c3 has been changed. If changed, c3 is saved, and at the same time the new data from address a1 is retrieved and stored in a data line in data structure 62. Then the tags are updated to replace c3 with a1 so the pointer points to the data line in which a1 is stored.

Figure 10:
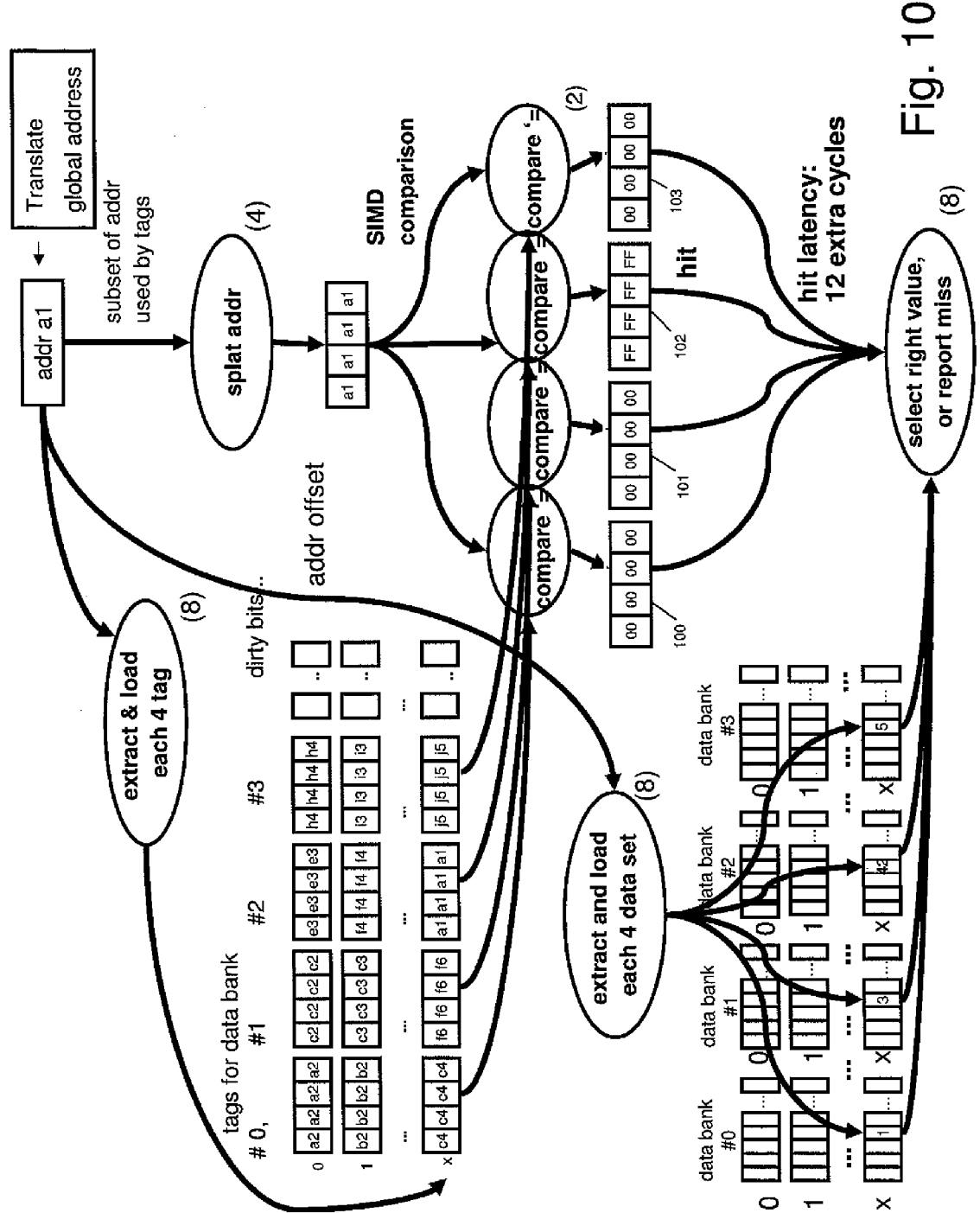
FIG. 10 illustrates the process for utilizing the architecture of the exemplary embodiment of FIG. 9.

The process for utilizing software architecture 60 can operate in accordance with the FIG. 10. Initially, the compiler determines the next address by translating the global address, e.g., address a1. Using the predefined mapping to determine which set address a1 is located, a SIMD operation extracts and loads each tag of set x, e.g., the four times replicated addresses of c4, f6, a1, j5, in SIMD registers. Again, as discussed above, when extracting and loading data in a SIMD operation, alignment issues must be addressed in accordance with any conventional SIMD alignment procedures to ensure that the data structure from which the data loads was carefully laid to prevent the loading of wrong data. At the same time, a splat of address a1 is performed which replicates the requested address in another SIMD register. The replication is done in a similar fashion as tags are stored in the cache directory 60. Concurrently, the lower part of the address is used to determine the offset, i.e., the location of the data in the data line, and the data from each data bank associated with the set x and the given offset is extracted and loaded into a four data set in a SIMD register, i.e., 1, 3, 42, 5.

The splatted address is compared to each of the SIMD registers containing the tags, and an entry identifying a miss, e.g., 0000, or an entry identifying a hit, e.g., FFFF, is entered into registers 100, 101, 102, 103. From the exemplary embodiment, it can be seen that the entry in register 102 identifies a hit from a comparison between the tag for data bank #2 and the splatted address. Then, the data entry contained in the exemplary data set corresponding to data bank #2, i.e., 42, is selected. If there is no hit, a miss report is generated and a DMA request is made.

According to this embodiment, the extracting and loading of the tags and the extracting and loading of the four data set of the data banks is completed in 8 cycles, while the address splat is completed in 4 cycles. Next, the SIMD comparison is completed in 2 cycles, then the right value from the four data set of the data banks is completed in 8 cycles. Thus, when there is a hit, the data is acquired in 18 cycles.

Figure 11:
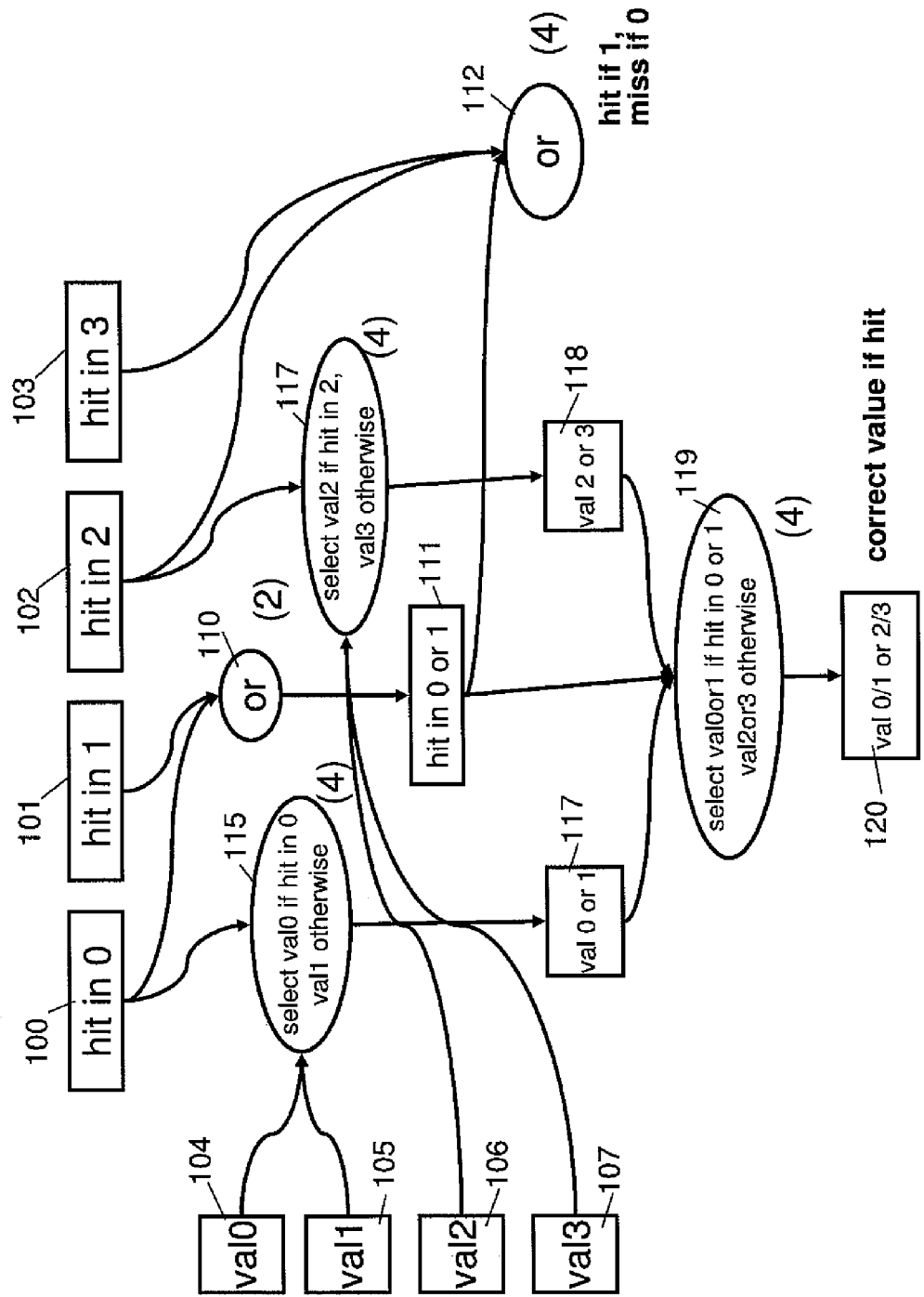
FIG. 11 illustrates a process for selecting the right value or reporting a miss in the alternative embodiment of the invention depicted in FIG. 9.

An example of an implementation of selecting the right value (or reporting a miss) is illustrated in FIG. 11. Across the top are four inputs, i.e., "hit in 0" (100), "hit in 1" (101), "hit in 2" (102), and "hit in 3" (103), which, with reference to FIG. 10, correspond to the SIMD registers after the SIMD comparison. From the SIMD comparison, it is found that the hit is in 102, i.e., the register containing the entry FFFF in FIG. 10, such that "hit in 2" is set high and the other entries are set low. Along the left-hand side are four inputs for the actual values in the address offsets in the data banks, which correspond to the data from the data banks associated with the offset, i.e., 1, 3, 42, 5. These values can be loaded into a SIMD register, whereby the entries can be identified as "val0" (104), "val1" (105), "val2" (106), and "val3" (107).

In the illustrated example, a Boolean determination is made in 110 whether a hit has occurred in 0 or 1, and the result is provided in block 111. A determination is then made in 112 whether a hit has been identified in block 111 or in 102 or 103. As typical with Boolean values, a hit typically corresponds to a nonzero value and a miss typically corresponds to a zero value. If, as in the instant example, a hit is found, the process continues to select the appropriate value. Otherwise, a miss report is made and a DMA request will be required to access the desired data. The determination of a hit or miss is completed in 4 cycles.

Concurrently with the determination of a hit or miss, the procedure begins a process of selecting the appropriate value in the event of a hit. Referring to the illustrated example, as there is no "hit in 0" 100 then "val1" 104, i.e., 3 is selected in accordance with block 115, and as there is a "hit in 2" 102 then "val2" 106, i.e., 42 is selected in accordance with block 116. This procedure is completed in 4 cycles. The selected values are loaded into respective registers "val 0 or 1" 117 and "val 2 or 3" 118 for selecting the appropriate value corresponding to the hit. In block 119, the value stored in "val 0 or 1" 117 is selected if block 111 identifies a hit in "hit in 0 or 1," otherwise the value stored in "val 2 or 3" 118 is selected and loaded in 120, which is the correct value in the event of a hit. This selection is completed in 4 cycles, such that the selection of the right value or reporting the miss is completed in only 8 cycles. Of course, this procedure for selecting the right value or reporting a miss is provided merely an example for ease of explaining the invention and is in no way to be construed as limiting.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The processes described herein can be implemented in the infrastructure shown in FIG. 1.

In another embodiment, the invention provides a business method that performs the process steps of the invention on a subscription, advertising, and/or fee basis. That is, a service provider, such as a Solution Integrator, could offer to generate optimized code. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While the invention has been described in terms of embodiments, those skilled in the art will recognize that the invention can be practiced with modifications and in the spirit and scope of the appended claims.

What is claimed:

1. A process of loading data associated with a requested address in a software cache, comprising:
   loading address tags associated with a set in a cache directory, into a Single Instruction Multiple Data (SIMD) register, using a SIMD operation;
   replicating an address tag of the requested address into another SIMD register such that the another SIMD register comprises a same number of replicated address tags of the request address as a number of the address tags loaded into the SIMD register;
   determining a position of the address tag of the requested address in the set using a SIMD comparison between the SIMD register and the another SIMD register;
   locating a data pointer corresponding to the position of the address tag of the requested address in the set; and
   loading an actual data value associated with the data pointer.

2. The process in accordance with claim 1, further comprising finding the set containing the address tag of the requested address through a predefined mapping of addresses.

3. The process in accordance with claim 1, wherein:
   the requested address comprises an upper part corresponding to the address tag and a lower part corresponding to an address offset to identify the actual data value associated with an address of a data line in a data structure; and
   the process further comprises:
      determining the address of the data line in the data structure based on the data pointer; and
      loading the actual data value associated with the address of the data line in the data structure and with the address offset.

4. The process in accordance with claim 1, wherein each set is composed of tag data banks, and each tag data bank comprises a plurality of entries filled with a respective address tag replicated in each entry, and
   wherein a data structure comprises data banks, in which each data bank is associated with a respective tag data bank, and
   wherein the data associated with each set and data bank is aligned in memory so as to be accessible by SIMD memory operations.

5. The process in accordance with claim 4, wherein, after the SIMD comparison, the process further comprises identifying a data bank containing the actual data value corresponding to the tag data bank for the requested address.

6. The process in accordance with claim 5, wherein the requested address comprises a lower part to determine an address offset to identify the actual data value in the data bank.

7. The process in accordance with claim 6, wherein the address offset is determined for each data bank before the SIMD comparison is completed.

8. The process in accordance with claim 1, further comprising before the SIMD comparison, aligning data in the SIMD register and the another SIMD register, the aligning comprising one of:
   shifting each of the data in the SIMD register and the another SIMD register from a current location to one of a right location and a left location; and
   shifting each of the data in the SIMD register and the another SIMD register from the current location to a zero location.

9. A cache memory comprising:
   a non-transitory computer-readable storage medium, comprising:
      a Single Instruction Multiple Data (SIMD) register loadable with address tags associated with a set in a cache directory using a SIMD operation;
      another SIMD loadable register loadable with an address tag of the requested address replicated into the another SIMD loadable register such that the another SIMD loadable register comprises a same number of replicated address tags of the requested address as a number of the address tags loaded into the SIMD register; and
      a data pointer corresponding to the position of the address tag of the requested address in the set; and
   a SIMD comparator operable to determine a position of the address tag of the requested address in the set using a SIMD comparison between the SIMD register and the another SIMD loadable register; and
   a determiner operable to load an actual data value associated with the data pointer,
   wherein the SIMD comparator and the determiner are executed by a processor.

10. The cache memory in accordance with claim 9, further comprising:
   a predefined mapping of addresses containing the set containing the address tag of the requested address.

11. The cache memory in accordance with claim 9, wherein:
   the requested address comprises an upper part corresponding to the address tag and a lower part corresponding to an address offset to identify the actual data value associated with an address of a data line in a data structure; and the determiner is further operable to:
      determine the address of the data line in the data structure based on the data pointer; and
      load the actual data value associated with the address of the data line in the data structure and with the address offset.

12. The cache memory in accordance with claim 9, wherein each set is composed of tag data banks, and each tag data bank comprises a plurality of entries fillable with a respective address tag replicated in each entry, and
   wherein a data structure comprises data banks, in which each data bank is associated with a respective tag data bank.

13. The cache memory in accordance with claim 12, further comprising a reader to read the actual data value contained in a data bank corresponding to the tag data bank for the requested address.

14. The cache memory in accordance with claim 13, wherein the requested address comprises a lower part to determine an address offset to identify the actual data value in the data bank.

15. The cache memory in accordance with claim 14, wherein the data line in each of the set can also be predetermined before the SIMD comparison completes.

16. The cache memory in accordance with claim 9, wherein the cache memory is a software cache stored on the tangible computer readable storage medium.

17. The cache memory in accordance with claim 9, further comprising an aligner operable to before the SIMD comparison, align data in the SIMD register and the another SIMD loadable register, the aligning comprising one of:
   shifting each of the data in the SIMD register and the another SIMD loadable register from a current location to one of a right location and a left location; and
   shifting each of the data in the SIMD register and the another SIMD loadable register from the current location to a zero location.

18. A computer program product comprising a non-transitory computer useable storage medium including a computer readable program, wherein the computer readable program when executed on a computer causes the computer to:
   load address tags associated with a set in a cache directory, into a Single Instruction Multiple Data (SIMD) register, using a SIMD operation;
   replicate an address tag of a requested address into another SIMD register such that the another SIMD register comprises a same number of replicated address tags of the request address as a number of the address tags loaded into the SIMD register;
   determine a position of the address tag of the requested address in the set using a SIMD comparison between the loaded address tags in the SIMD register and the replicated address tags of the requested address in the another SIMD register; and
   determine an actual data value associated with the position of the address tag of the requested address in the set.

19. The computer program product in accordance with claim 18, wherein the computer readable program when executed on a computer further causes the computer to:
   find the set containing the address tag of the requested address through a predefined mapping of addresses.

20. The computer program product in accordance with claim 18, wherein:
   the requested address comprises an upper part corresponding to the address tag and a lower part corresponding to an address offset to identify the actual data value associated with an address of a data line in a data structure; and the computer readable program when executed on the computer further causes the computer to:
      determine the address of the data line in the data structure based on a data pointer corresponding to the position of the address tag of the requested address in the set; and
      load the actual data value associated with the address of the data line in the data structure and with the address offset.

21. The computer program product of claim 18, wherein, after the SIMD comparison, the computer readable program when executed on a computer further causes the computer to:
   locate a data pointer corresponding to the position of the address tag of the requested address in the set; and
   load the actual data value associated with the data pointer.

22. The computer program product in accordance with claim 18, wherein each set is composed of tag data banks, and each tag data bank comprises a plurality of entries filled with a respective address tag replicated in each entry, and
   wherein a data structure comprises data banks, in which each data bank is associated with a respective tag data bank.

23. The computer program product in accordance with claim 22, wherein, after the SIMD comparison, the process further comprises identifying a data bank containing the actual data value corresponding to the tag data bank for the requested address.

24. The computer program product in accordance with claim 23, wherein the requested address comprises a lower part to determine an address offset to identify the actual data value in the data bank.

25. The computer program product in accordance with claim 24, wherein the address offset is determined for each data bank before the SIMD comparison is completed.

26. The computer program product of claim 18, wherein the computer readable program when executed on a computer further causes the computer to before the SIMD comparison, align data in the SIMD register and the another SIMD register, the aligning comprising one of:
   shifting each of the data in the SIMD register and the another SIMD register from a current location to one of a right location and a left location; and
   shifting each of the data in the SIMD register and the another SIMD register from the current location to a zero location.

27. A system comprising a software cache stored on a non-transitory computer readable storage medium, the software cache loading data associated with a requested address and including instructions that, when executed by the system, cause the system to:
   load address tags associated with a set in a cache directory, into a Single Instruction Multiple Data (SIMD) register, using a SIMD operation;
   replicate an address tag of the requested address into another SIMD register such that the another SIMD register comprises a same number of replicated address tags of the request address as a number of the address tags loaded into the SIMD register;

determine a position of the address tag of the requested address in the set using a SIMD comparison between the loaded address tags in the SIMD register and the replicated address tags of the requested address in the another SIMD register; and determine an actual data value associated with the position of the address tag of the requested address in the set.

28. The system in accordance with claim 27, wherein the software cache includes further instructions that, when executed by the system, cause the system to:

find the set containing the address tag of the requested address through a predefined mapping of addresses.

29. The system in accordance with claim 27, wherein:

the requested address comprises an upper part corresponding to the address tag and a lower part corresponding to an address offset to identify the actual data value associated with an address of a data line in a data structure; and the software cache includes further instructions that, when executed by the system, cause the system to:

determine the address of the data line in the data structure based on a data pointer corresponding to the position of the address tag of the requested address in the set; and load the actual data value associated with the address of the data line in the data structure and with the address offset.

30. The system in accordance with claim 27, wherein the software cache includes further instructions that, when executed by the system, cause the system to:

locate a data pointer corresponding to the position of the address tag of the requested address in the set; and load the actual data value associated with the data pointer.

31. The system in accordance with claim 27, wherein each set is composed of tag data banks, and each tag data bank comprises a plurality of entries filled with a respective address tag replicated in each entry, and wherein a data structure comprises data banks, in which each data bank is associated with a respective tag data bank.

32. The system in accordance with claim 31, wherein the software cache includes further instructions that, when executed by the system, cause the system to identify a data bank containing the actual data value corresponding to the tag data bank for the requested address.

33. The system in accordance with claim 32, wherein the requested address comprises a lower part to determine an address offset to identify the actual data value in the data bank.

34. The system in accordance with claim 33, wherein the address offset is determined for each data bank before the SIMD comparison is completed.

35. The system in accordance with claim 27, wherein the software cache includes further instructions that, when executed by the system, cause the system to before the SIMD comparison, align data in the SIMD register and the another SIMD register, the aligning comprising one of:

shifting each of the data in the SIMD register and the another SIMD register from a current location to one of a right location and a left location; and shifting each of the data in the SIMD register and the another SIMD register from the current location to a zero location.

36. A process of loading data associated with a requested address in a software cache, comprising:

loading address tags associated with a set in a cache directory, into a Single Instruction Multiple Data (SIMD) register, using a SIMD operation;

finding the set containing an address tag of the requested address through a predefined mapping of addresses;

replicating the address tag of the requested address into another SIMD register such that the another SIMD register comprises a same number of replicated address tags of the request address as a number of the address tags loaded into the SIMD register;

determining a position of the address tag of the requested address in the set using a SIMD comparison between the SIMD register and the another SIMD register, wherein the requested address comprises an upper part corresponding to the address tag and a lower part corresponding to a location of the actual data value in a data line of a data structure and associated with an address of the data line in the data structure;

determining the address of the data line in the data structure based on a data pointer corresponding to the position of the address tag of the requested address in the set; and loading the actual data value associated with the address of the data line in the data structure and with the location of the actual data value in the data line of the data structure.

37. The process in accordance with claim 36, wherein each set is composed of tag data banks, and each tag data bank comprises a plurality of entries filled with a respective address tag replicated in each entry, and a data structure comprises data banks, in which each data bank is associated with a respective tag data bank, and the process further comprises, after the SIMD comparison, identifying a data bank containing the data line with the actual data value.

38. The process in accordance with claim 36, further comprising before the SIMD comparison, aligning data in the SIMD register and the another SIMD register, the aligning comprising one of:

shifting each of the data in the SIMD register and the another SIMD register from a current location to one of a right location and a left location; and shifting each of the data in the SIMD register and the another SIMD register from the current location to a zero location.

* * * * *